United States Patent
Xing

(10) Patent No.: US 11,411,706 B2
(45) Date of Patent: Aug. 9, 2022

(54) RESOURCE BLOCK GROUP PARTITIONING METHOD AND USER EQUIPMENT

(71) Applicant: CHINA ACADEMY OF TELECOMMUNICATIONS TECHNOLOGY, Beijing (CN)

(72) Inventor: Yanping Xing, Beijing (CN)

(73) Assignee: DATANG MOBILE COMMUNICATIONS EQUIPMENT CO., LTD., Beijing (CN)

( * ) Notice: Subject to any disclaimer, the term of this patent is extended or adjusted under 35 U.S.C. 154(b) by 28 days.

(21) Appl. No.: 16/646,394

(22) PCT Filed: Jun. 15, 2018

(86) PCT No.: PCT/CN2018/091553
§ 371 (c)(1),
(2) Date: Mar. 11, 2020

(87) PCT Pub. No.: WO2019/056815
PCT Pub. Date: Mar. 28, 2019

(65) Prior Publication Data
US 2020/0274677 A1 Aug. 27, 2020

(30) Foreign Application Priority Data
Sep. 21, 2017 (CN) .......................... 201710860820.1

(51) Int. Cl.
*H04L 5/00* (2006.01)
*H04W 72/04* (2009.01)

(52) U.S. Cl.
CPC .......... *H04L 5/0092* (2013.01); *H04L 5/0064* (2013.01); *H04W 72/0446* (2013.01); *H04W 72/0453* (2013.01); *H04W 72/0493* (2013.01)

(58) Field of Classification Search
CPC ............... H04L 5/0092; H04L 5/0064; H04W 72/0446; H04W 72/0453; H04W 72/0493
See application file for complete search history.

(56) References Cited

U.S. PATENT DOCUMENTS

2012/0115526 A1* 5/2012 Ogawa ................... H04B 1/713
455/509
2013/0089063 A1 4/2013 Yang et al.
(Continued)

FOREIGN PATENT DOCUMENTS

CN 102970709 A 3/2013
CN 102970753 A 3/2013
(Continued)

OTHER PUBLICATIONS

Chinese Office Action dated Mar. 3, 2020, for CN Application No. 201710860820.1.
(Continued)

*Primary Examiner* — Michael Thier
*Assistant Examiner* — Nevena Zecevic Sandhu
(74) *Attorney, Agent, or Firm* — Harness, Dickey & Pierce, P.L.C.

(57) ABSTRACT

A resource block group partitioning method and user equipment are provided. The method includes: determining a resource block included in a first resource block group in a bandwidth part; determining a resource block included in other resource block group in the bandwidth part according to a pre-acquired resource block group size, wherein the other RBG is a resource block group other than the first resource block group in the bandwidth part.

8 Claims, 7 Drawing Sheets

(56) References Cited

U.S. PATENT DOCUMENTS

| | | | |
|---|---|---|---|
| 2015/0063231 A1 | 3/2015 | Seo et al. | |
| 2016/0014778 A1 | 1/2016 | Zhou et al. | |
| 2020/0092864 A1* | 3/2020 | Chen | H04W 72/04 |
| 2020/0120642 A1* | 4/2020 | Hwang | H04L 5/005 |

FOREIGN PATENT DOCUMENTS

| | | |
|---|---|---|
| KR | 10-2016-0139062 A | 12/2016 |
| WO | WO-2013/105832 A1 | 7/2013 |
| WO | WO-2014/029329 A1 | 2/2014 |

OTHER PUBLICATIONS

International Preliminary Report on Patentability and Written Opinion for International Application No. PCT/CN2018/091553 dated Mar. 24, 2020.

Huawei et al, 3GPP TSG RAN WG1 Ad Hoc Meeting, R1-1800535, Summary of remaining issues on PRB bundling for DL, Jan. 26, 2018.

CATT 3GPP TSG RAN WG1 Meeting AH 1801, R1-1800257 On PDSCH and PUSCH resource allocation 26.1, Jan. 26, 2018.

3GPP TSG RAN WG1 NR Meeting #90, R1-1713654, Prague, Czech Republic Aug. 21-26, 2017.

3GPP-TS 38.214, V1.0.0, 3rd Generation Partnership Project; Technical Specification Group Radio Access Network; NR; Physical layer procedures for date (Release 15) Sep. 2017.

3GPP TSG-RAN WWG1 NR Ad-Hoc#2, R1-1710249, Qingdao, P.R. China, Jun. 30, 2017.

Taiwanese Office Action dated Jun. 18, 2019 for Application No. 107122268.

Japanese Office Action dated Mar. 24, 2021 for Japanese Patent Application No. 2020-516689 (with English translation).

Korean Office Action dated Sep. 5, 2021 for Korean Patent Application No. 10-2020-7008863 (with English translation).

Interdigital, Inc., "On frequency-domain resource allocation for NR", 3GPP TSG RAN WG1 Meeting #90, R1-1714159, Aug. 21-25, 2017, Prague, Czech Republic.

* cited by examiner

RESOURCE BLOCK GROUP PARTITIONING METHOD AND USER EQUIPMENT

CROSS-REFERENCE TO RELATED APPLICATION

This application is a U.S. national phase application of a PCT Application No. PCT/CN2018/091553 filed on Jun. 15, 2018, which claims a priority to Chinese Patent Application No. 201710860820.1, filed in China on Sep. 21, 2017, the disclosure of which is incorporated herein by reference in its entirety.

TECHNICAL FIELD

The present disclosure relates to the field of communication technology, and in particular to a resource block group (RBG) partitioning method and user equipment.

BACKGROUND

For a downlink in a communication system, RBG-based resource allocation is supported. The RBG refers to a group of continuously distributed resource blocks (RBs). An RBG size may be represented by P, wherein the P is determined by a downlink system bandwidth $N_{RB}^{DL}$. For example, in case that the $N_{RB}^{DL}$ is less than or equal to 10, the P is equal to 1; in case that the $N_{RB}^{DL}$ is greater than or equal to 11 and less than or equal to 26, the P is equal to 2; and so on. A quantity of RBGs corresponding to the entire downlink system bandwidth $N_{RB}^{DL}$ is $N_{RBG} = \lceil N_{RB}^{DL}/P \rceil$, wherein $\lceil \ \rceil$ refers to rounding up to an integer, and the RBGs are numbered in ascending order of frequency and have a non-increasing RBG size.

However, in communication systems, such as a new radio (NR) communication system, user equipment may not support full-bandwidth transmission and reception. Therefore, a concept of carrier band width part (BWP) is introduced in the NR communication system. The BWP is a continuous physical resource block (PRB) subset of a carrier. The user equipment only transmits and receives in an active BWP, and RBs in the BWP are numbered starting from 0. If the RBG partitioning method in the related art is still adopted, in case that the BWPs of different user equipment overlap, a situation in which the RBG partitioning mismatch may occur. For example, as shown in FIG. 1, after RBG #3 of user equipment 3 is occupied, RBG #1 of user equipment 2 may not be used, and since boundary of RBG #1 of the user equipment 2 is not aligned with boundary of RBG #3 of user equipment 3, some RBs may not be allocated by using an RBG-based mechanism. It could be seen that the use of the RBG partitioning method in the related art will result in a relatively low resource-reuse efficiency.

SUMMARY

The embodiments of the present disclosure provide an RBG partitioning method and user equipment, so as to solve the problem of relatively low resource-reuse efficiency.

Some embodiments of the present disclosure provide an RBG partitioning method including:
determining an RB included in a first RBG in a BWP;
determining an RB included in other RBG in the BWP according to a pre-acquired RBG size, wherein the other RBG is an RBG other than the first RBG in the BWP.

Optionally, the first RBG is a first RBG on a low frequency side of the BWP;
the determining the RB included in other RBG in the BWP according to the pre-acquired RBG size includes:
determining the RB included in other RBG in the BWP in ascending order of frequency according to the pre-acquired RBG size;
or,
the first RBG is a first RBG on a high frequency side of the BWP;
the determining the RB included in other RBG in the BWP according to the pre-acquired RBG size includes:
determining the RB included in other RBG in the BWP in descending order of frequency according to the pre-acquired RBG size.

Optionally, the determining the RB included in the first RBG in the BWP includes:
determining the RB included in the first RBG in the BWP according to a notification message transmitted by a network side; or
determining the RB included in the first RBG in the BWP according to an offset between a first RB in the BWP and a first RB of a carrier bandwidth.

Optionally, the notification message includes:
a starting position of the first RBG, an ending position of the first RBG, a quantity of the RB included in the first RBG, or a starting position of a second RBG in the BWP.

Optionally, the determining the RB included in the first RBG in the BWP according to the notification message transmitted by the network side includes:
taking an RB belonging to the BWP among a quantity P of RBs starting from the starting position of the first RBG as the RB included in the first RBG in case that the notification message includes the starting position of the first RBG, wherein the P is the RBG size; or taking at least one RB starting from the first RB in the BWP as the RB included in the first RBG in case that the notification message includes the ending position of the first RBG, wherein an ending position of the at least one RB is the ending position of the first RBG; or
taking at least one RB starting from the first RB in the BWP as the RB included in the first RBG in case that the notification message includes the quantity of the RB included in the first RBG, wherein a quantity of the at least one RB is the quantity of the RB included in the first RBG; or
taking at least one RB starting from the first RB in the BWP as the RB included in the first RBG in case that the notification message includes the starting position of the second RBG, wherein an ending position of the at least one RB is an RB immediately previous to the starting position of the second RBG.

Optionally, the determining the RB included in the first RBG in the BWP according to the offset between the first RB in the BWP and the first RB of the carrier bandwidth includes:
determining a quantity T of RBs in the BWP as the RB included in the first RBG, wherein the T is equal to P-(S mod P), the P is the RBG size, the S is the offset, and the mod is a remainder function.

Optionally, the determining the quantity T of RBs in the BWP as the RB included in the first RBG includes:
taking a quantity T of RBs starting from the first RB in the BWP as the RB included in the first RBG.

Some embodiments of the present disclosure provide user equipment, including:
a first determination module, configured to determine an RB included in a first RBG of a BWP;

a second determination module, configured to determine an RB included in other RBG in the BWP according to a pre-acquired RBG size, wherein the other RBG is an RBG other than the first RBG in the BWP.

Optionally, the first determination module is configured to determine the RB included in the first RBG in the BWP according to a notification message transmitted by a network side; or the first determination module is configured to determine the RB included in the first RBG in the BWP according to an offset between a first RB in the BWP and a first RB of a carrier bandwidth.

Optionally, the notification message includes: a starting position of the first RBG, an ending position of the first RBG, a quantity of the RB included in the first RBG, or a starting position of a second RBG in the BWP.

Optionally, the first determination module is configured to determine a quantity T of RBs in the BWP as the RB included in the first RBG, wherein the T is equal to P-(S mod P), the P is the RBG size, the S is the offset, and the mod is a remainder function.

Some embodiments of the present disclosure provide user equipment, including a storage, a processor and a computer program stored in the storage and configured to be executed by the processor; wherein the processor is configured to read the program in the storage to implement following steps:

determining an RB included in a first RBG in a BWP;

determining an RB included in other RBG in the BWP according to a pre-acquired RBG size, wherein the other RBG is an RBG other than the first RBG in the BWP.

Optionally, the first RBG is a first RBG on a low frequency side of the BWP;

the determining the RB included in other RBG in the BWP according to the pre-acquired RBG size includes:

determining the RB included in other RBG in the BWP in ascending order of frequency according to the pre-acquired RBG size;

or, the first RBG is a first RBG on a high frequency side of the BWP;

the determining the RB included in other RBG in the BWP according to the pre-acquired RBG size includes:

determining the RB included in other RBG in the BWP in descending order of frequency according to the pre-acquired RBG size.

Optionally, the determining the RB included in the first RBG in the BWP includes:

determining the RB included in the first RBG in the BWP according to a notification message transmitted by a network side; or determining the RB included in the first RBG in the BWP according to an offset between a first RB in the BWP and a first RB of a carrier bandwidth.

Optionally, the notification message includes:

a starting position of the first RBG, an ending position of the first RBG, a quantity of the RB included in the first RBG, or a starting position of a second RBG in the BWP.

Optionally, the determining the RB included in the first RBG in the BWP according to the notification message transmitted by the network side includes:

taking an RB belonging to the BWP among a quantity P of RBs starting from the starting position of the first RBG as the RB included in the first RBG in case that the notification message includes the starting position of the first RBG, wherein the P is the RBG size; or taking at least one RB starting from the first RB in the BWP as the RB included in the first RBG in case that the notification message includes the ending position of the first RBG, wherein an ending position of the at least one RB is the ending position of the first RBG; or taking at least one RB starting from the first RB in the BWP as the RB included in the first RBG in case that the notification message includes the quantity of the RB included in the first RBG, wherein a quantity of the at least one RB is the quantity of the RB included in the first RBG; or taking at least one RB starting from the first RB in the BWP as the RB included in the first RBG in case that the notification message includes the starting position of the second RBG, wherein an ending position of the at least one RB is an RB immediately previous to the starting position of the second RBG.

Optionally, the determining the RB included in the first RBG in the BWP according to the offset between the first RB in the BWP and the first RB of the carrier bandwidth includes:

determining a quantity T of RBs in the BWP as the RB included in the first RBG, wherein the T is equal to P-(S mod P), the P is the RBG size, the S is the offset, and the mod is a remainder function.

Optionally, the determining the quantity T of RBs in the BWP as the RB included in the first RBG includes:

taking a quantity T of RBs starting from the first RB in the BWP as the RB included in the first RBG.

Some embodiments of the present disclosure further provides a computer readable storage medium storing therein a computer program, wherein the computer program is configured to be executed by a processor to implement steps of the RBG partitioning method provided in the embodiment of the present disclosure.

In the embodiments of the present disclosure, RB included in the first RBG in the BWP is determined, RB included in other RBG in the BWP is determined according to a pre-acquired RBG size, wherein the P is the RBG size, the other RBG is an RBG other than the first RBG in the BWP. Since the RB included in the first RBG is determined firstly, then the other RBG is partitioned according to the RBG size, compared with the related art, all RBGs are partitioned according to the RBG size, which may reduce or avoid the mismatch of RBG partitioning between different user equipment, thereby improving resource utilization efficiency.

BRIEF DESCRIPTION OF THE DRAWINGS

In order to more clearly illustrate the technical solutions in embodiments of the present disclosure, the drawings used in the description of the embodiments of the present disclosure will be briefly introduced below. Obviously, the drawings in the following description are only some embodiments of the present disclosure. Based on these drawings, other drawings may be obtained by those of ordinary skill in the art without any creative efforts.

DETAILED DESCRIPTION

The technical solutions of embodiments of the present disclosure will be clearly and completely described below with reference to the drawings of embodiments of the present disclosure. Apparently, the described embodiments are some embodiments of the present disclosure, instead of all the embodiments. Based on the embodiments of the present disclosure, all other embodiments derived by a person of ordinary skill in the art without any creative efforts shall fall within the scope of the present disclosure.

Figure 1:
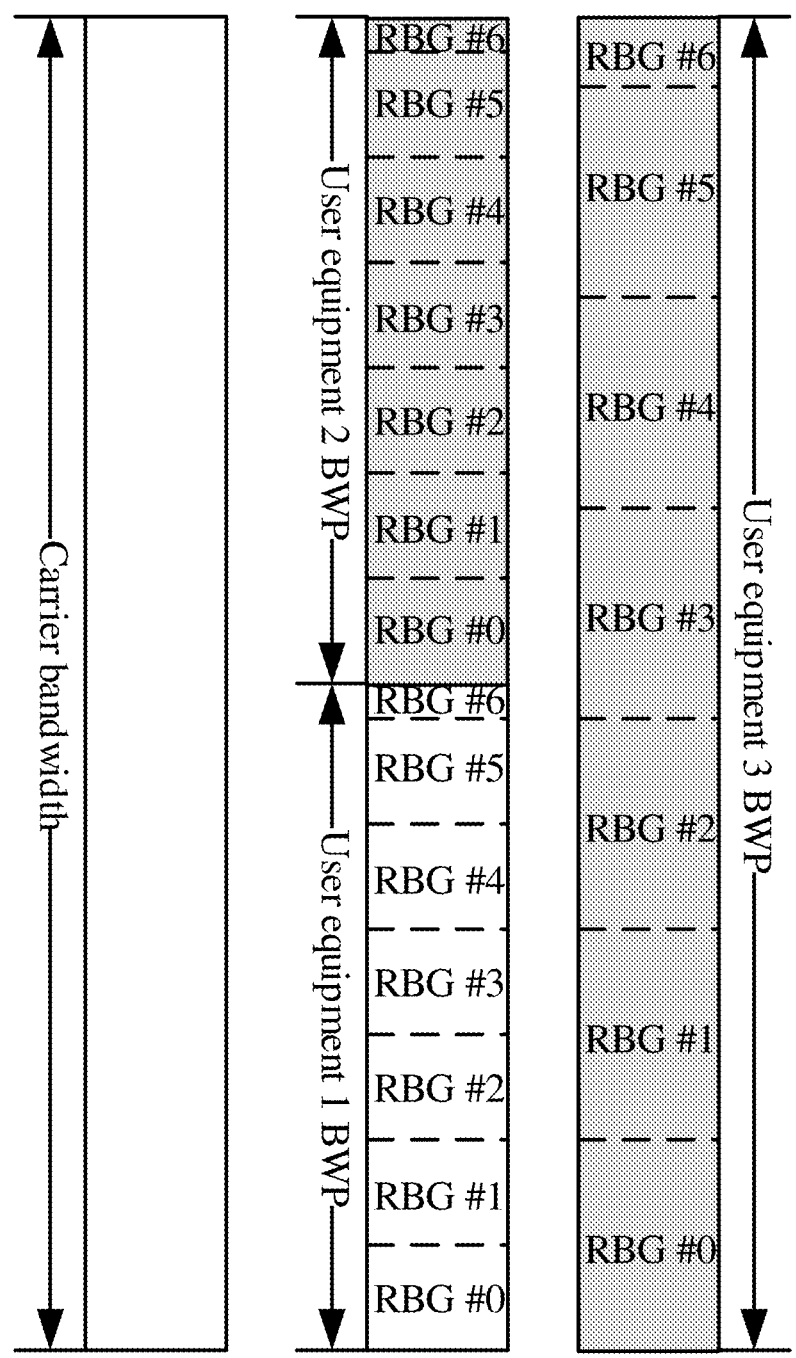
FIG. 1 is a schematic diagram of an RBG partitioning in the related art.
Figure 2:
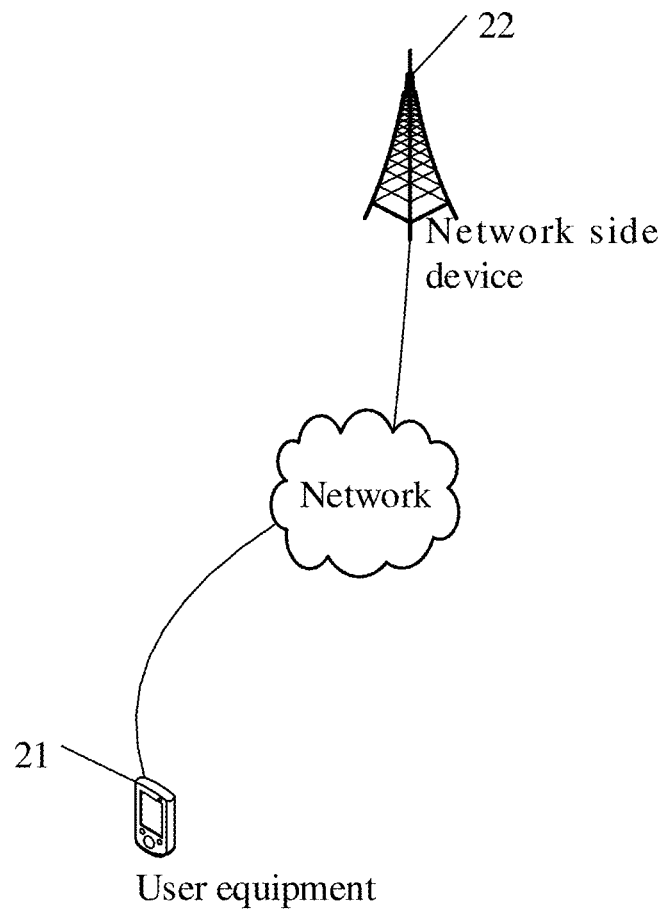
FIG. 2 is a schematic diagram of a network structure to which embodiments of the present disclosure are applicable.

Referring to FIG. 2, FIG. 2 is a schematic diagram of a network structure to which embodiments of the present disclosure are applicable. As shown in FIG. 2, user equipment (UE) 21 and a network-side device 22 are included. The user equipment 21 may be a terminal side device such as a mobile phone, a tablet personal computer, a laptop computer, a personal digital assistant (PDA), a mobile Internet device (MID), or a wearable device, it should be noted that the specific type of the user equipment 21 is not limited in the embodiments of the present disclosure. The network side device 22 may be a base station, such as, a macro station, an LTE eNB, a 5G NR NB, and the like; the network side device 22 may also be a small station, such as a low power node (LPN), a pico node, a femto node; or the network side device 22 may be an access point (AP); the base station may also be a network node composed of a central unit (CU) and a plurality of transmission reception points (TRP) managed and controlled by the CU. It should be noted that a specific type of the network side device 22 is not limited in the embodiments of the present disclosure.

Figure 3:
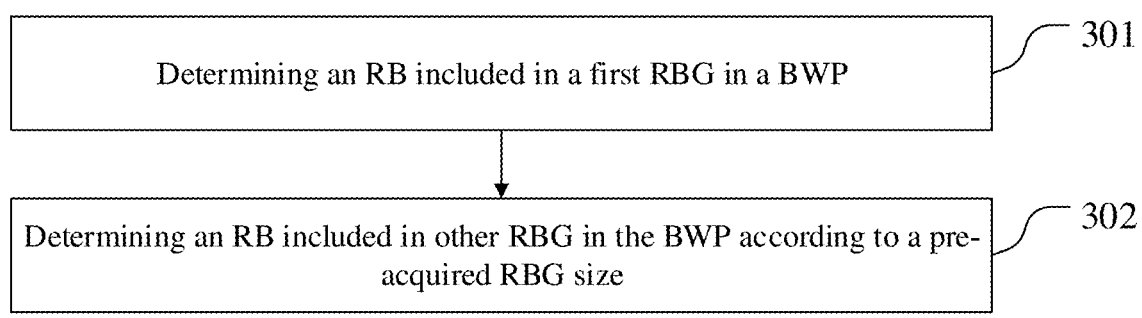
FIG. 3 is a flowchart of an RBG partitioning method provided in some embodiments of the present disclosure.

Referring to FIG. 3, FIG. 3 is a flowchart of an RBG partitioning method provided in some embodiments of the present disclosure. As shown in FIG. 3, the method includes the following steps.

Step 301 includes: determining an RB included in a first RBG in a BWP;

Step 302 includes: determining an RB included in other RBG in the BWP according to a pre-acquired RBG size, wherein the other RBG is an RBG other than the first RBG in the BWP.

The first RBG in the BWP may be the first RBG on a side of the BWP, such as, the first RBG on the low frequency side, or the first RBG on the high frequency side. The first RBG on the low frequency side may be understood as the first RBG in the BWP in ascending order of frequency, that is, the RBs included in the RBG are RBs with the lowest frequencies in the BWP; while the first RBG on the high frequency side may be understood as the first RBG in the BWP in descending order of frequency, that is, the RBs included in the RBG are RBs with the highest frequency in the BWP. In addition, in some embodiments of the present disclosure, the first RB in the BWP is also the first RB on one side, such as, the first RB on the low frequency side, or the first RB on the high frequency side. The first RB on the low frequency side may be understood as the RB with the lowest frequency in the BWP, while the first RB on the high frequency side can be understood as the RB with the highest frequency in the BWP. For a first RB of a carrier bandwidth, a reference may be made to the first RB in the BWP, which is not described here.

In addition, the determined RB included in the first RBG in the BWP may be determined by the user equipment according to a notification message transmitted by the network side, or determined by the user equipment according to a pre-acquired determination rule, which is not limited in the embodiments of the present disclosure. The quantity of RBs included in the first RBG may be less than or equal to the RBG size. The above RBG size may be calculated by the user equipment according to a configured bandwidth or may be configured on the network side, which is not limited to the embodiments of the present disclosure.

The step 302 may include: subtracting the quantity of RBs in the first RBG from the quantity of RBs in the BWP and then dividing the result by P to obtain RBs included in other RBGs. It should be noted that, in the embodiments of the present disclosure, the RBG size may be represented by P.

For example: the quantity of RBs in the BWP is N, and the quantity of RBs in the first RBG is P1, then the quantity of RBGs, except the first RBG, is $$\left\lceil \frac{N-P1}{P} \right\rceil.$$

The size of each of $$\left\lfloor \frac{N-P1}{P} \right\rfloor$$

Figure 4:
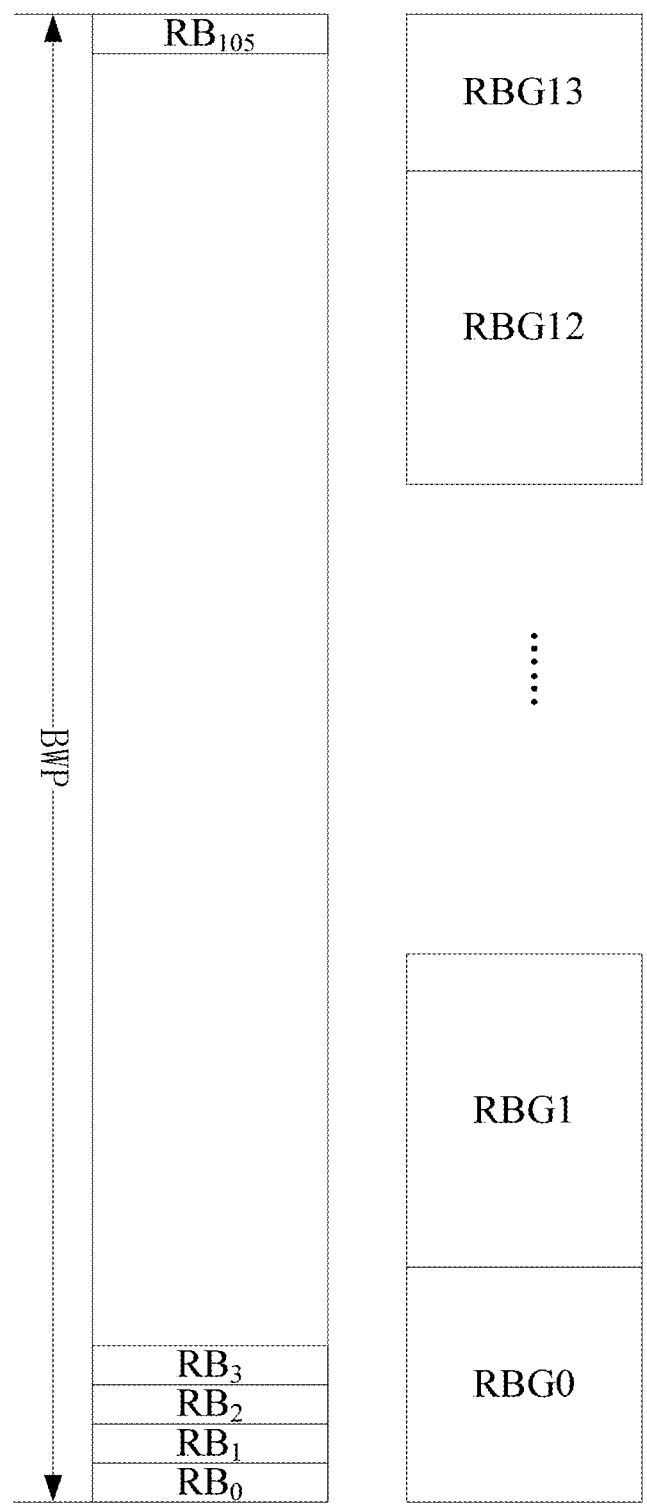
FIG. 4 is a schematic diagram of RBG partitioning provided in some embodiments of the present disclosure.

RBGs is P. If (N-P1) mod P>0, the size of one of the RBGs is N-P1-P·⌊N-P1/P⌋, wherein ⌈ ⌉ is rounding up to an integer, ⌊ ⌋ is rounding down to an integer, and the mod is a remainder operation. For example, as shown in FIG. 4, the quantity N of RBs included in the BWP is 106, the size P of the RBG is 8, and the size P1 of the first RBG is 6, then in addition to RBG0, there are $$\left\lceil \frac{106-6}{8} \right\rceil = 13 \text{ RBGs},$$

wherein the size of each of 12 RBGs are 8 and the size of the remaining RBG is 4.

Figure 5:
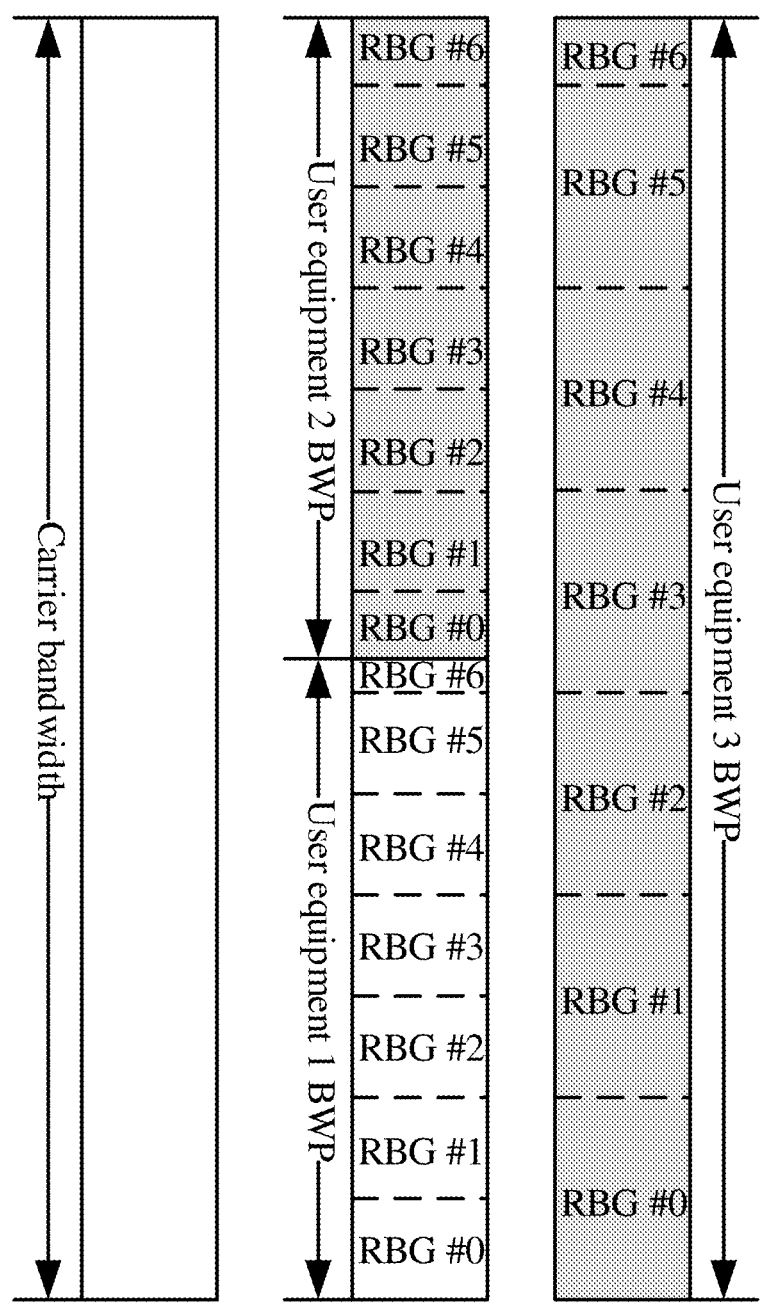
FIG. 5 is another schematic diagram of RBG partitioning provided in some embodiments of the present disclosure.

It should be noted that, through the above steps, the RBs included in the first RBG in the BWP may be determined firstly, and other RBGs are partitioned according to the RBG size. In this way, in case that BWPs of a plurality of user equipment overlap, BWP RBG partitioning for the plurality of user equipment are matched in terms, that is, the RBG partitioning of different BWPs in the carrier are matched, thereby improving resource usage efficiency. For example, as shown in FIG. 5, user equipment 2 firstly determines the RBs included in the first RBG (RBG #0), and other RBGs (RBG #1 to RBG #6) are partitioned according to the above RBG size, so that RBGs of the user equipment 2 and user equipment 3 are matched to improve resource utilization efficiency.

In an optional embodiment, the first RBG is a first RBG on a low frequency side of the BWP; the determining the RB included in other RBG in the BWP according to the pre-acquired RBG size includes: determining the RB included in other RBG in the BWP in ascending order of frequency according to the pre-acquired RBG size; or, the first RBG is a first RBG on a high frequency side of the BWP; the determining the RB included in other RBG in the BWP according to the pre-acquired RBG size includes: determining the RB included in other RBG in the BWP in descending order of frequency according to the pre-acquired RBG size;

This embodiment may flexibly determine RBs included in the first RBG and the RBs included in other RBGs. Therefore, the flexibility of the RBG partitioning is improved, so as to adapt to different communication services and different communication scenarios, and improve the communication performance of user equipment.

In another optional embodiment, determining the RB included in the first RBG in the BWP includes: determining the RB included in the first RBG in the BWP according to a notification message transmitted by a network side.

The notification message may be configured to notify the user equipment of parameters for determining the RB included in the first RBG. After the user equipment acquires the notification message, the user equipment may accurately determine the RB included in the first RBG. Moreover, because the notification message is transmitted by the network side, it may be ensured that the RBG partitioning of the plurality of user equipment matches in case that BWPs of a plurality of user equipment overlap. Because the network side knows the BWP of each user equipment, the network side may make the RBGs partitioned by various user equipment matched through the above notification message, to improve resource usage efficiency.

Optionally, the notification message includes: a starting position of the first RBG, an ending position of the first RBG, a quantity of the RB included in the first RBG, or a starting position of a second RBG in the BWP.

The RB included in the first RBG may be determined flexibly through the above notification message.

In addition, the notification message including the starting position of the first RBG, the ending position of the first RBG, the quantity of the RB included in the first RBG, or the starting position of a second RBG in the BWP may be understood as the notification message carrying the information, that is, in the embodiments of the present disclosure, the notification message includes, but is not limited to, the starting position of the first RBG, the ending position of the first RBG, the quantity of RBs included in the first RBG, or the starting position of the second RBG in the BWP. For example, in addition to the information, the above notification message may also include other information configured by the network side for the user equipment. Of course, the other information may not be included, that is, only the above mentioned information is included. The notification message may be a message newly defined in the embodiment of the present disclosure, or the notification message may be a message defined in a protocol in related art. In the embodiments of the present disclosure, the starting position of the first RBG, the ending position of the first RBG, the quantity of RBs included in the first RBG, or the starting position of the second RBG in the BWP may be added to the message in the related art, to reduce transmission overhead.

The determining the RB included in the first RBG in the BWP according to the notification message transmitted by the network side may include:

taking an RB belonging to the BWP among a quantity P of RBs starting from the starting position of the first RBG as the RB included in the first RBG in case that the notification message includes the starting position of the first RBG, wherein the P is the RBG size; or taking at least one RB starting from the first RB in the BWP as the RB included in the first RBG in case that the notification message includes the ending position of the first RBG, wherein an ending position of the at least one RB is the ending position of the first RBG; or taking at least one RB starting from the first RB in the BWP as the RB included in the first RBG in case that the notification message includes the quantity of the RB included in the first RBG, wherein a quantity of the at least one RB is the quantity of the RB included in the first RBG; or taking at least one RB starting from the first RB in the BWP as the RB included in the first RBG in case that the notification message includes the starting position of the second RBG, wherein an ending position of the at least one RB is an RB immediately previous to the starting position of the second RBG.

Hereinafter, the above implementation of determining the first RBG is exemplified by assuming that the BWP of the user equipment includes a quantity N of RBs, which are numbered $RB_0$, $RB_1$, ..., $RB_{N-1}$ in ascending order of frequency, and the network side notifies the user equipment of the first RBG position on the low frequency side of the BWP.

Mode 1, the network side notifies the starting position of the first RBG.

The network side notifies the starting RB number of the first RBG. For example, the starting RB number $I_{start}$ ranges from $-N_1$, $-N_1+1$, ..., 0, wherein the $N_1=P-1$ and the P is the RBG size. The size of the first RBG is $P+I_{start}$, and $RB_0$ to $RB_{P+I_{start}}$ are included.

Mode 2, the network side notifies the ending position of the first RBG.

The network side notifies the ending RB number of the first RBG. Specifically, the ending RB number $I_{end}$ ranges from 0, 1, ..., $N_2$, wherein the $N_2=P-1$, and the P is the RBG size. The size of the first RBG is $I_{end}+1$, and $RB_0$ to $RB_{I_{end}}$ are included.

Mode 3, the network side notifies the size of the first RBG.

The network side notifies the size P1 of the first RBG, then the RBs included in the first RBG are $RB_0$ to $RB_{P1}$, and P1 ranges from 1, 2, ..., P, and the P is the RBG size.

Mode 4, the network side notifies the starting position of the second RBG.

The network side notifies the starting RB number of the second RBG. For example, the starting RB number $I'_{start}$ ranges from 1, 2, ..., P, the RBs included in the first RBG are the first $I'_{start}$ RBs, i.e., $RB_0$ to $RB_{I'_{start}-1}$ are included.

Figure 6:
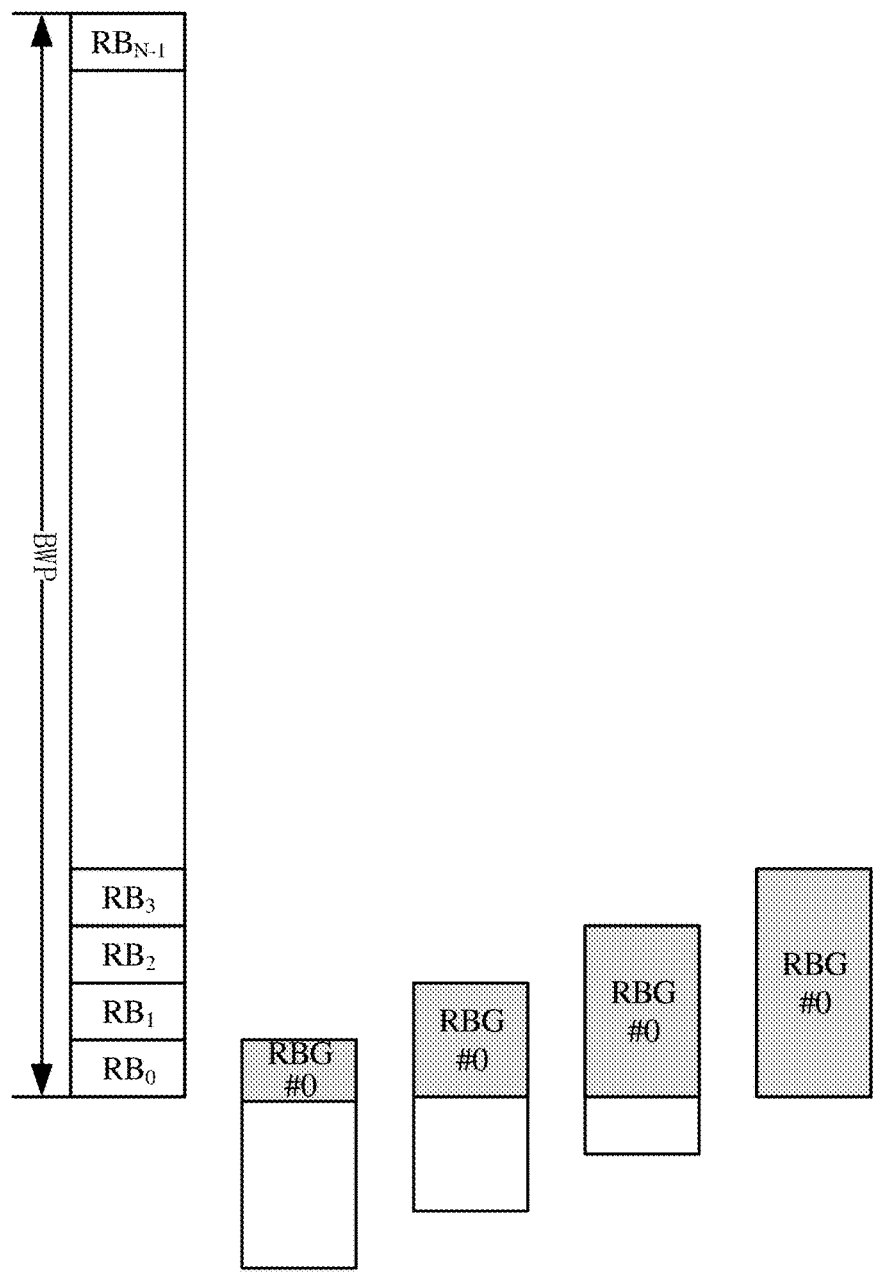
FIG. 6 is yet another schematic diagram of RBG partitioning provided in some embodiments of the present disclosure.

The RBG size P=4 is assumed, as shown in FIG. 6, FIG. 6 is a schematic diagram of the position and the size of the first RBG in case that $I_{start}=-3$, $-2$, $-1$, $0/I_{end}=0$, 1, 2, 3/P1=1, 2, 3, 4/$I'_{start}=1$, 2, 3, 4. In case that $I_{start}=-3/I_{end}=0/$P1=1/$I'_{start}=1$, the size of the first RBG is 1, and only the $RB_0$ is included; in case that $I_{start}=-2/I_{end}=1/$P1=2/$I'_{start}=2$, the size of the first RBG is 2, and the $RB_0$ and the $RB_1$ are included; in case that $I_{start}=-1/I_{end}=2/$P1=3/$I'_{start}=3$, the size of the first RBG is 3, and the $RB_0$, the $RB_1$ and the $RB_2$ are included; in case that $I_{start}=0/I_{end}=3/$P1=4/$I'_{start}=4$, the size of the first RBG is 4, and the $RB_0$ to the $RB_3$ are included.

Through the above modes, the RB included in the first RBG may be determined flexibly and accurately.

In another optional embodiment, the determining the RB included in the first RBG in the BWP includes: determining the RB included in the first RBG in the BWP according to an offset between a first RB in the BWP and a first RB of a carrier bandwidth.

Figure 7:
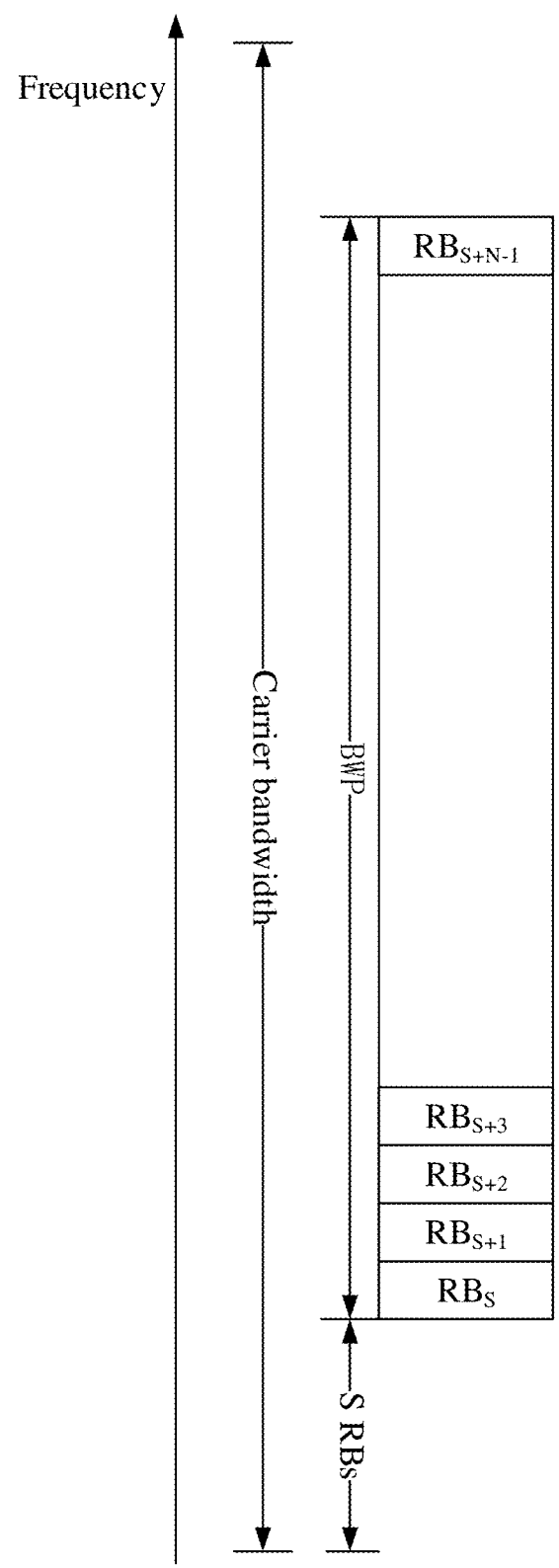
FIG. 7 is a schematic diagram of RB offsets provided in some embodiments of the present disclosure.

The above offset may be understood as the quantity of RBs by which the first RB in the BWP are spaced from the first RB of the carrier bandwidth. For example, in case that the RBs of the BWP of the user equipment are numbered from RB0 in ascending order of frequency, the first RB (RB0) in the BWP has an index of RBs in the carrier bandwidth, and the index of the first RB of the carrier bandwidth is RB0, then the offset is S as shown in FIG. 7.

It should be noted that both the first RB in the BWP and the first RB of the carrier bandwidth refer to the first RBs on a same side. For example, the first RB in the BWP and the first RB of the carrier bandwidth are the first RB on the low frequency side of the BWP and the first RB on the low frequency side of the carrier bandwidth respectively, or the first RB on the high frequency side of the BWP and the first RB on the high frequency side of the carrier bandwidth respectively.

In this implementation, it may be achieved that each user equipment determines the RB included in the first RBG in the BWP according to the user equipment's own offset. In practice, the RBG sizes of user equipment are generally in a multiple relationship, for example: the RBG sizes are respectively equal to 1, 2, 4, 8 and 16, etc. In this way, as shown in FIG. 5, the RBG partitioning of overlapping BWPs are matched, so as to improve resource utilization efficiency.

Optionally, the determining the RB included in the first RBG in the BWP according to the offset between the first RB in the BWP and the first RB of the carrier bandwidth includes:

determining a quantity T of RBs in the BWP as the RB included in the first RBG, wherein the T is equal to P-(S mod P), the P is the RBG size, the S is the offset, and the mod is a remainder function.

It may be realized that the quantity of RBs included in the first RBG is T. Of course, it should be noted that, because BWPs of different user equipment are different, different user equipment may have different T. For example, assuming that user equipment has P=8 and S=106, the size of the first RBG is 8-106% 8=6, wherein the 106% 8 means 106 modulo 8, then in FIG. 7, RBG #0 includes $RB_S$ to $RB_{S+5}$.

Since the T is equal to P-S mod P, and in practice, the P of user equipment are generally in a multiple relationship, boundaries of the RBGs partitioned by various user equipment may be aligned. For example, P of user equipment 3 is twice as much as P of user equipment 1 and user equipment 2, and T of the user equipment 1 and the user equipment 3 are respectively equal to their P, that is, S mod P is equal to 0, and T of the user equipment 2 is less than P of the user equipment 2. Through the above steps, the RBG partitioning as shown in FIG. 5 may be achieved. Boundaries of RBG #0 to RBG #5 of the user equipment 1 and boundaries of RBG #0 to RBG #2 of the user equipment 3 are aligned, and boundaries of RBG #1 to RBG #5 of the user equipment 2 and boundaries of RBG #3 to RBG #5 of the user equipment 3 are aligned, wherein P of the user equipment 3 is twice as much as P of the user equipment 1 and P of the user equipment 2.

Optionally, the determining the quantity T of RBs in the BWP as the RB included in the first RBG includes: taking a quantity T of RBs starting from the first RB in the BWP as the RB included in the first RBG.

In the implementation, the first quantity T of RBs in the BWP may be taken as the RBs included in the first RBG (RBG #0), so that it is easier to ensure that, in case that BWPs of a plurality of user equipment overlap, the RBG partitioning in the BWPs of user equipment match. For example, as shown in FIG. 5, for the user equipment 1, S mod P is equal to 0, then the first RBG (RBG #0) includes the first quantity P of RBs; for the user equipment 2, the T is less than P, then the first RBG (RBG #0) includes the first quantity T of RBs; for the user equipment 3, S mod P is equal to 0, then the first RBG (RBG #0) includes the first quantity P of RBs.

It should be noted that, a plurality of optional implementations described in the embodiments of the present disclosure may be implemented in combination or separately, which is not limited to the embodiments of the present disclosure.

In the embodiments of the present disclosure, the RB included in the first RBG in the BWP is determined, RB included in other RBG in the BWP is determined according to the pre-acquired P, wherein the P is the RBG size, the other RBG is an RBG other than the first RBG in the BWP. Since RBs included in the first RBG are determined firstly, and the other RBGs are partitioned according to the P, compared with the related art in which all RBGs are partitioned according to the P, the mismatch of the RBG partitioning between different user equipment may be reduced or avoided, thereby improving resource utilization efficiency.

Figure 8:
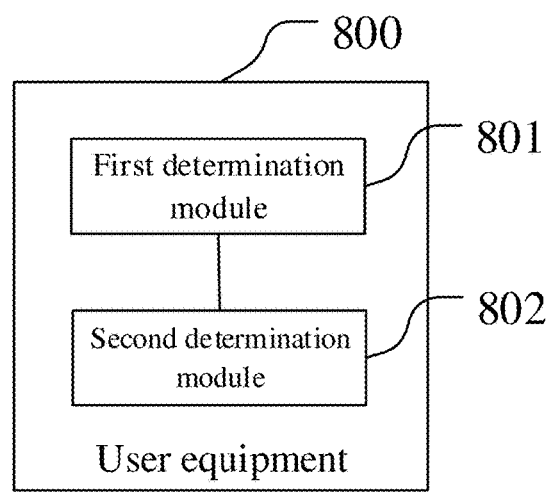
FIG. 8 is a structural diagram of user equipment provided in some embodiments of the present disclosure.

Referring to FIG. 8, FIG. 8 is a schematic structural diagram of user equipment provided in some embodiments of the present disclosure. As shown in FIG. 8, user equipment 800 includes:

a first determination module 801, configured to determine an RB included in a first RBG of a BWP;

a second determination module 802, configured to determine an RB included in other RBG in the BWP according to a pre-acquired RBG size, wherein the other RBG is an RBG other than the first RBG in the BWP.

Optionally, the first RBG is a first RBG on a low frequency side of the BWP; the second determination module 802 is configured to determine the RB included in other RBG in the BWP in ascending order of frequency according to the pre-acquired RBG size; or, the first RBG is a first RBG on a high frequency side of the BWP; the second determination module 802 is configured to determine the RB included in other RBG in the BWP in descending order of frequency according to the pre-acquired RBG size.

Optionally, the first determination module 801 is configured to determine the RB included in the first RBG in the BWP according to a notification message transmitted by a network side; or the first determination module 801 is configured to determine the RB included in the first RBG in the BWP according to an offset between a first RB in the BWP and a first RB of a carrier bandwidth.

Optionally, the notification message includes: a starting position of the first RBG, an ending position of the first RBG, a quantity of the RB included in the first RBG, or a starting position of a second RBG in the BWP.

Optionally, the first determination module 801 is configured to take an RB belonging to the BWP among a quantity P of RBs starting from the starting position of the first RBG as the RB included in the first RBG in case that the notification message includes the starting position of the first RBG, wherein the P is the RBG size; or the first determination module 801 is configured to take at least one RB starting from the first RB in the BWP as the RB included in the first RBG in case that the notification message includes the ending position of the first RBG, wherein an ending position of the at least one RB is the ending position of the first RBG; or the first determination module 801 is configured to take at least one RB starting from the first RB in the BWP as the RB included in the first RBG in case that the notification message includes the quantity of the RB included in the first RBG, wherein a quantity of the at least one RB is the quantity of the RB included in the first RBG; or the first determination module 801 is configured to take at least one RB starting from the first RB in the BWP as the RB included in the first RBG in case that the notification message includes the starting position of the second RBG, wherein an ending position of the at least one RB is an RB immediately previous to the starting position of the second RBG.

Optionally, the first determination module 801 is configured to determine a quantity T of RBs in the BWP as the RB included in the first RBG, wherein the T is equal to P-(S mod P), the P is the RBG size, the S is the offset, and the mod is a remainder function.

Optionally, the first determination module 801 is configured to take a quantity T of RBs starting from the first RB in the BWP as the RB included in the first RBG.

It should be noted that, the above-mentioned user equipment 800 in the present embodiment may be any user equipment implemented according to the method embodiments in the present disclosure, any implementation of the user equipment in the method embodiments in the present disclosure may be implemented by the above-mentioned user equipment 800 in the present embodiment, and the same beneficial effects are achieved, which is not detailed herein again.

Figure 9:
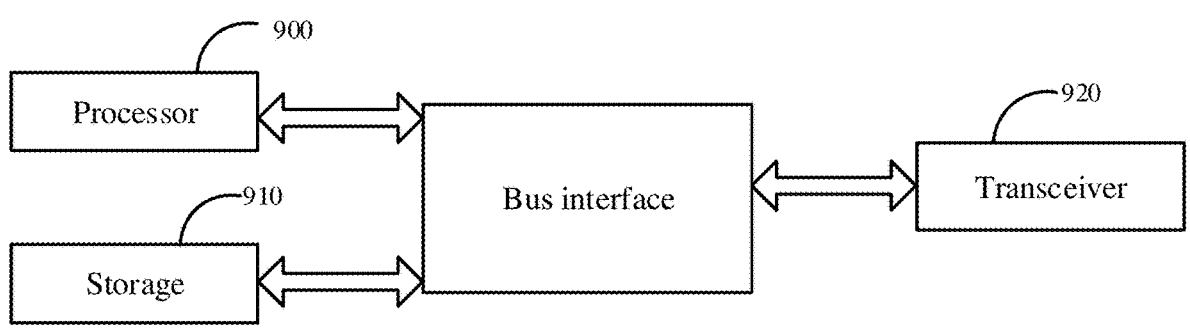
FIG. 9 is another structural diagram of user equipment provided in some embodiments of the present disclosure.

Referring to FIG. 9, FIG. 9 is another structural diagram of user equipment according to some embodiments of the present disclosure. As shown in FIG. 9, the user equipment includes: a storage 910, a processor 900, and a computer program stored in the storage 910 and configured to be executed by the processor 900.

The processor 900 is configured to read the computer program in the storage 910 to implement the following process:

determining an RB included in a first RBG of a BWP;

determining an RB included in other RBG in the BWP according to a pre-acquired RBG size, wherein the other RBG is an RBG other than the first RBG in the BWP.

Of course, in some embodiments, the above-mentioned user equipment may further include a transceiver 920, where the transceiver 920 is configured to receive and transmit data under the control of the processor 900.

In FIG. 9, a bus architecture may include any number of interconnected buses and bridges. Various circuits, specifically, one or more processors represented by the processor 900 and a storage represented by the storage 910, are linked together. The bus architecture may also link various other circuits such as peripherals, voltage regulators and power management circuits, which are well known in the art, and therefore a further description is omitted herein. The bus interface provides interfaces. The transceiver 920 may be a plurality of elements, that is, including a transmitter and a receiver, to provide units configured to communicate with various other apparatuses over a transmission medium.

The processor 900 is responsible for managing the bus architecture and general processing, and the storage 910 can store data used by the processor 900 during operations.

It should be noted that the storage 910 is not limited to a device on user equipment, and the storage 910 and the processor 900 may be located separately in different geographical locations.

Optionally, the first RBG is a first RBG on a low frequency side of the BWP; the determining the RB included in other RBG in the BWP according to the pre-acquired RBG size includes: determining the RB included in other RBG in the BWP in ascending order of frequency according to the pre-acquired RBG size; or, the first RBG is a first RBG on a high frequency side of the BWP; the determining the RB included in other RBG in the BWP according to the pre-acquired RBG size includes: determining the RB included in other RBG in the BWP in descending order of frequency according to the pre-acquired RBG size.

Optionally, the determining the RB included in the first RBG in the BWP includes: determining the RB included in the first RBG in the BWP according to a notification message transmitted by a network side; or determining the RB included in the first RBG in the BWP according to an offset between a first RB in the BWP and a first RB of a carrier bandwidth.

Optionally, the notification message includes: a starting position of the first RBG, an ending position of the first RBG, a quantity of the RB included in the first RBG, or a starting position of a second RBG in the BWP.

Optionally, the determining the RB included in the first RBG in the BWP according to the notification message transmitted by the network side includes:

taking an RB belonging to the BWP among a quantity P of RBs starting from the starting position of the first RBG as the RB included in the first RBG in case that the notification message includes the starting position of the first RBG, wherein the P is the RBG size; or taking at least one RB starting from the first RB in the BWP as the RB included in the first RBG in case that the notification message includes the ending position of the first RBG, wherein an ending position of the at least one RB is the ending position of the first RBG; or taking at least one RB starting from the first RB in the BWP as the RB included in the first RBG in case that the notification message includes the quantity of the RB included in the first RBG, wherein a quantity of the at least one RB is the quantity of the RB included in the first RBG; or taking at least one RB starting from the first RB in the BWP as the RB included in the first RBG in case that the notification message includes the starting position of the second RBG, wherein an ending position of the at least one RB is an RB immediately previous to the starting position of the second RBG.

Optionally, the determining the RB included in the first RBG in the BWP according to the offset between the first RB in the BWP and the first RB of the carrier bandwidth includes:

determining a quantity T of RBs in the BWP as the RB included in the first RBG, wherein the T is equal to P-(S mod P), the P is the RBG size, the S is the offset, and the mod is a remainder function.

Optionally, the determining the quantity T of RBs in the BWP as the RB included in the first RBG includes:

taking a quantity T of RBs starting from the first RB in the BWP as the RB included in the first RBG.

It should be noted that the above-mentioned user equipment in the present embodiment may be any user equipment implemented according to the method embodiments in the present disclosure, any implementation of the user equipment in the method embodiments in the present disclosure may be implemented by the above-mentioned user equipment in the present embodiment, and the same beneficial effects are achieved, which is not detailed herein again.

Some embodiments of the present disclosure further provide a computer readable storage medium storing therein a computer program, wherein the computer program is configured to be executed by a processor to implement steps of the RBG partitioning method provided in the embodiments of the present disclosure.

In some embodiments provided by the present application, it should be noted that, the disclosed method and device can be implemented in other manners. For example, the described device embodiment is merely exemplary. For example, the unit division is merely logical function division and may be other division in actual implementation. For example, a plurality of units or components may be combined or integrated into another system, or some features may be ignored or not performed. In addition, the shown or discussed mutual couplings or direct couplings or communication connections may be implemented through some interfaces. The indirect couplings or communication connections between the devices or units may be implemented in electric, mechanical, or other forms.

In addition, each functional unit in various embodiments of the present disclosure may be integrated into one processing unit, or each unit may exist physically in separation, or two or more units may be integrated into one unit. The integrated unit may be implemented through hardware, or may also be implemented in a form of hardware plus a software functional module.

The integrated unit implemented in the form of a software functional module can be stored in a computer readable storage medium. The above software functional module is stored in a storage medium, including instructions for a computer device (e.g., a personal computer, a server or a network device, etc.) to execute some steps of the method described in embodiments of the present disclosure. The above storage medium includes various media that can store program codes, such as a USB flash drive, a mobile hard disk, a read-only memory (ROM), a random access memory (RAM), a magnetic disk, or an optical disc.

The above descriptions merely describe optional implementations of the present disclosure. It is appreciated, modifications and improvements may be made by a person of ordinary skill in the art without departing from the principle of the present disclosure, and these modifications and improvements shall fall within the scope of the present disclosure.

What is claimed is:

1. A resource block group (RBG) partitioning method, comprising:
   determining a resource block (RB) comprised in a first RBG in a bandwidth part (BWP), wherein the BWP is a BWP in new radio (NR);
   determining an RB comprised in other RBG in the BWP according to a pre-acquired RBG size, wherein the other RBG is an RBG other than the first RBG in the BWP;
   wherein the determining the RB comprised in the first RBG in the BWP comprises:
   determining the RB comprised in the first RBG in the BWP according to an offset between a first RB in the BWP and a first RB of a carrier bandwidth;
   wherein the determining the RB comprised in the first RBG in the BWP according to the offset between the first RB in the BWP and the first RB of the carrier bandwidth comprises:
   determining a quantity T of RB in the BWP as the RB comprised in the first RBG, wherein the T is equal to P-(S mod P), the P is the RBG size, the S is the offset, and the mod is a remainder function.

2. The RBG partitioning method according to claim 1, wherein the first RBG is a first RBG on a low frequency side of the BWP;
   the determining the RB comprised in the other RBG in the BWP according to the pre-acquired RBG size comprises:
   determining the RB comprised in the other RBG in the BWP in ascending order of frequency according to the pre-acquired RBG size;
   or,
   the first RBG is a first RBG on a high frequency side of the BWP;
   the determining the RB comprised in the other RBG in the BWP according to the pre-acquired RBG size comprises:
   determining the RB comprised in the other RBG in the BWP in descending order of frequency according to the pre-acquired RBG size.

3. The RBG partitioning method according to claim 1, wherein the determining the quantity T of the in the BWP as the RB comprised in the first RBG comprises:
   taking the quantity T of the RB starting from the first RB in the BWP as the RB comprised in the first RBG.

4. A non-transitory computer readable storage medium storing therein a computer program, wherein the computer program is configured to be executed by a processor to implement steps of the RBG partitioning method according to claim 1.

5. User equipment, comprising:
   a first determination circuit, configured to determine a resource block (RB) comprised in a first resource block group (RBG) in a bandwidth part (BWP), wherein the BWP is a BWP in new radio (NR);
   a second determination circuit, configured to determine an RB comprised in other RBG in the BWP according to a pre-acquired RBG size, wherein the other RBG is an RBG other than the first RBG in the BWP;
   wherein
   the first determination circuit is configured to determine the RB comprised in the first RBG in the BWP according to an offset between a first RB in the BWP and a first RB of a carrier bandwidth;
   wherein the first determination circuit is configured to determine a quantity T of RB in the BWP as the RB comprised in the first RBG, wherein the T is equal to P-(S mod P), the P is the RBG size, the S is the offset, and the mod is a remainder function.

6. User equipment, comprising a storage, a processor and a computer program stored in the storage and configured to be executed by the processor; wherein
   the processor is configured to read the computer program in the storage to implement following steps:
   determining a resource block (RB) comprised in a first resource block group (RBG) in a bandwidth part (BWP), wherein the BWP is a BWP in new radio (NR);
   determining an RB comprised in other RBG in the BWP according to a pre-acquired RBG size, wherein the other RBG is an RBG other than the first RBG in the BWP;
   wherein the determining the RB comprised in the first RBG in the BWP comprises:
   determining the RB comprised in the first RBG in the BWP according to an offset between a first RB in the BWP and a first RB of a carrier bandwidth;

wherein the determining the RB comprised in the first RBG in the BWP according to the offset between the first RB in the BWP and the first RB of the carrier bandwidth comprises:

determining a quantity T of RB in the BWP as the RB comprised in the first RBG, wherein the T is equal to P-(S mod P), the P is the RBG size, the S is the offset, and the mod is a remainder function.

7. The user equipment according to claim 6, wherein the first RBG is a first RBG on a low frequency side of the BWP;

the determining the RB comprised in the other RBG in the BWP according to the pre-acquired RBG size comprises:

determining the RB comprised in the other RBG in the BWP in ascending order of frequency according to the pre-acquired RBG size;

or, the first RBG is a first RBG on a high frequency side of the BWP;

the determining the RB comprised in the other RBG in the BWP according to the pre-acquired RBG size comprises:

determining the RB comprised in the other RBG in the BWP in descending order of frequency according to the pre-acquired RBG size.

8. The user equipment according to claim 6, wherein the determining the quantity T of the RB in the BWP as the RB comprised in the first RBG comprises:

taking the quantity T of the RB starting from the first RB in the BWP as the RB comprised in the first RBG.

* * * * *